Figure 4:
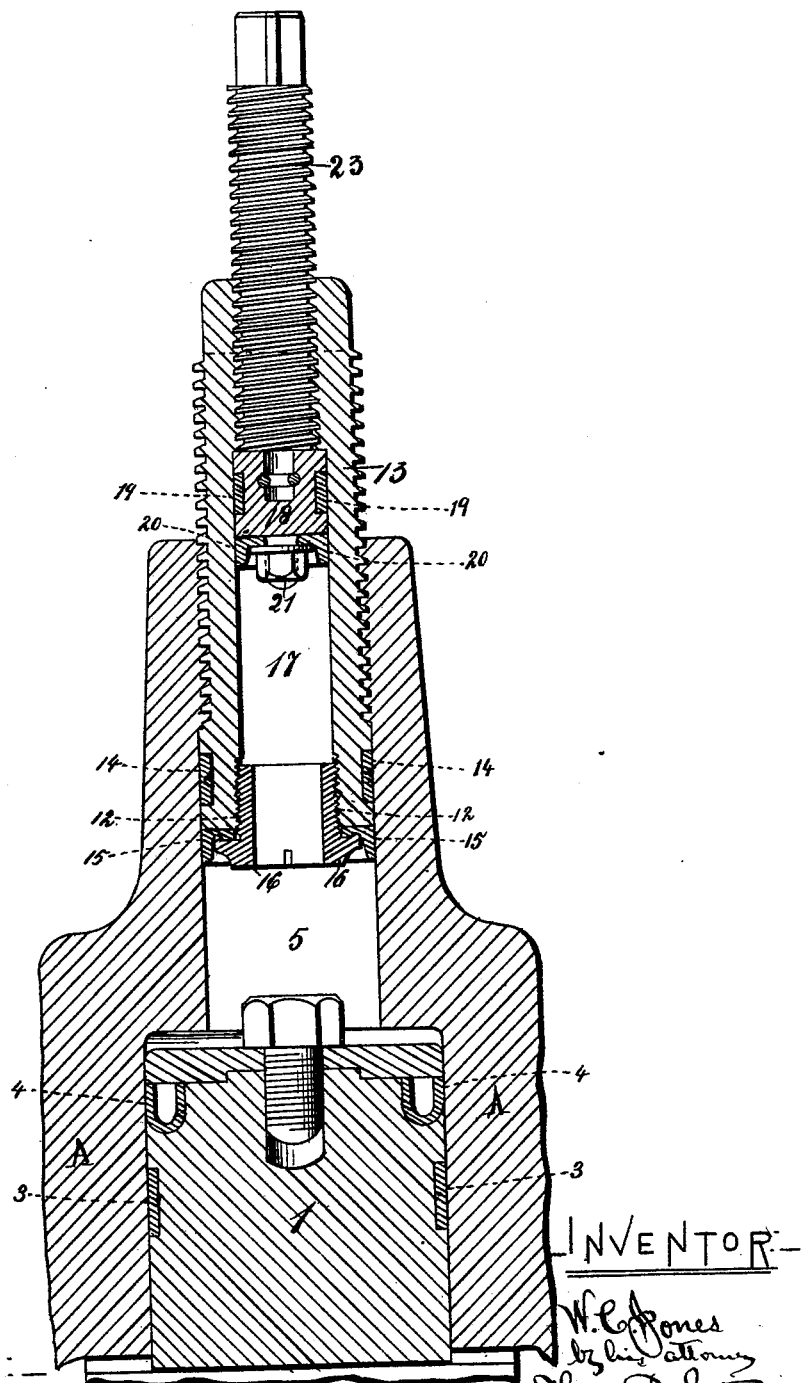

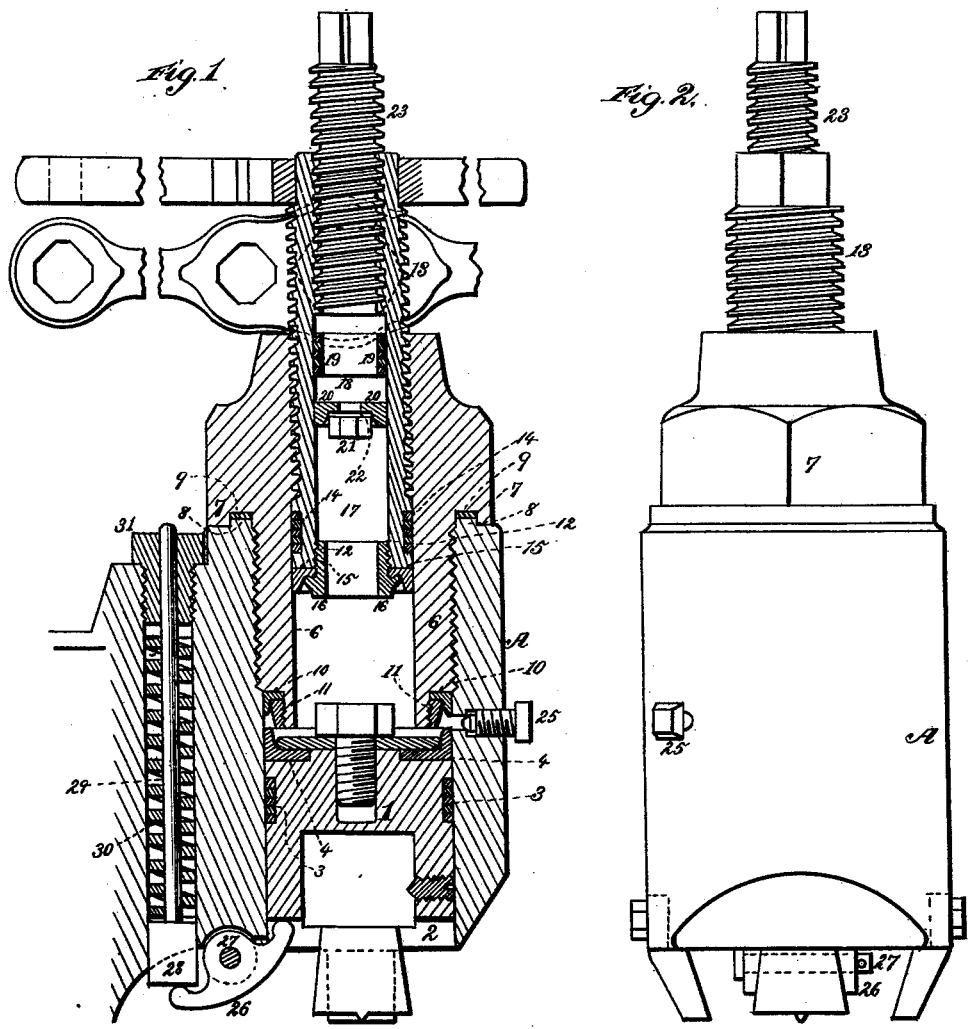

W. C. JONES.
Hydraulic Punching Machine.

No. 233,419. Patented Oct. 19, 1880.

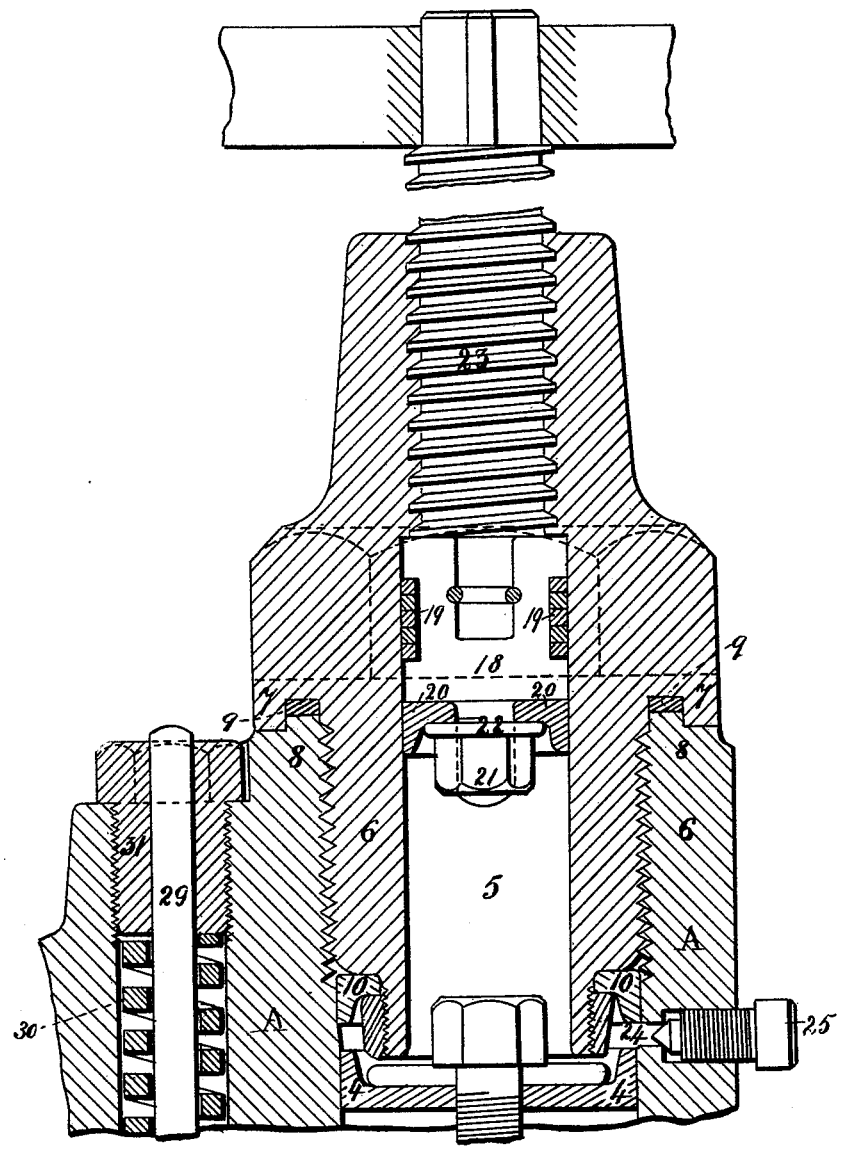

UNITED STATES PATENT OFFICE.

WILLIAM C. JONES, OF SYRA, ONE OF THE ISLANDS OF THE GRECIAN ARCHIPELAGO.

HYDRAULIC PUNCHING-MACHINE.

SPECIFICATION forming part of Letters Patent No. 233,419, dated October 19, 1880.

Application filed December 17, 1878. Patented in England September 4, 1878.

*To all whom it may concern:*

Be it known that I, WILLIAM CALVERT JONES, of Syra, one of the islands of the Grecian Archipelago, engineer, have invented new and useful Improvements in Hydraulic Machines for Punching, Shearing, and Riveting, of which the following is a specification.

My invention relates to hydraulic machines for punching, shearing, and riveting.

Figure 1 of the accompanying drawings shows in vertical section, Fig. 2 in side elevation, and Fig. 3 in plan, the upper portion of a machine constructed according to my invention. Figs. 4 and 5 are enlarged central vertical sections of Fig. 2.

The lower portion of the machine may be of ordinary or other construction suitable for the intended purpose of punching, riveting, or shearing.

The operating-tool, which in the drawings is a punch, but for which a blade or a die may obviously be substituted, is carried by a ram, 1, working in a cylindrical chamber, 2, formed in the body A. The ram is made to fit accurately by packing 3 and a cup-leather, 4, which latter, during the downstroke, is forced by the liquid pressure against the interior surface of the chamber. The packing 3 aids to make the joint tight during the downstroke, but is of most important use during the upstroke, maintaining the joint approximately tight during such movement, when the cup-leather 4 is of no effect.

Above the chamber 2 is a cylindrical chamber or extension, 5, of smaller diameter. This cylindrical chamber or extension 5 is made in a separate piece of metal, 6, arranged to screw into the upward extension of the chamber 2, and formed with a grooved shoulder, 7, arranged to close against the top end, 8, of the extension of the chamber 2, packing 9 being interposed to make a tight joint.

10 is a cup-leather arranged around the lower part of the chamber or extension 5, and kept in place by a screwed ring or nut, 11, to make the joint tight under pressure or vacuum, and to protect the screwed upper part of the joint between 6 and A, lower chamber, 2, from the liquid.

The chamber or extension 5 may be made in one piece with the lower chamber, 2, as shown in Fig. 4; but it will be found advantageous to make them separate, as already described.

In the cylindrical chamber or extension 5 is a plunger, 12, with a screw, 13, by which the plunger can be moved up and down in the chamber or extension 5, in which the plunger is made tight by packing 14 and a cup-leather, 15, held in place by a nut or ferrule, 16.

Within the plunger 12 is formed a third cylindrical chamber or extension, 17, in which fits a second plunger, 18. This plunger is solid and is made to move with a tight fit in the chamber or extension 17 by packing 19 and a cup-leather, 20, secured by a nut, 21, and washer 22, and can be moved vertically in the said chamber by the screw 23.

The space between the plunger 18 and the ram 1 is charged with liquid through the hole 24, closed by the screw-plug 25.

The relative proportions of the chambers or spaces 2, 5, and 17 may be varied to suit the power required. In punching and shearing, the extreme pressure is only required for a small portion of the stroke, and the intermediate space or chamber, 5, enables me to reduce the stroke of the forcing-screw and secure a quicker action.

26 is a small lever having its fulcrum at 27. One end of this lever presses against the face of the ram 1. The other end of the lever presses against the head 28 of a rod, 29, able to slide in a hole in the body of the machine, as shown.

30 is a spiral spring surrounding the rod 29 and compressed between the head 28 and the perforated cap or nut 31. The object of this arrangement is to assist the atmospheric pressure in returning the ram 1. A similar arrangement may in some cases be applied also at the opposite side of the ram. This combination allows the body of the plunger 1 to come close to the surface of the material being punched, only the slight thickness of the lever-arm 26 being necessarily reserved, while the long range of the spring 30 is available to exert an active force in urging the same inward so soon as the pressure of the water is relaxed.

For working the forcing-screws I use crosshandles, each constructed with three holes, as shown, to give three different lengths of leverage, according to the power required.

In some cases the intermediate plunger, 12, and chamber 17 may be dispensed with, as shown in Fig. 5, without sacrificing the benefit of the other parts of the invention.

Machines constructed according to my invention, as hereinabove set forth, may be provided with slipper-soles, which may be fixed to any suitable bed, with one or more bolts, so that the machines can be slipped into the slipper-soles and used as fixed machines.

When using my machines for punching, the punches employed may advantageously have their faces either concave or spiral, so as to reduce the pressure required in punching.

I claim as my invention—

1. In a machine for hydraulic punching and riveting, the combination, with the body A, screw-threaded internally for a portion of its length, and the piece 6, screw-threaded externally and adapted to fit in the screw-threaded portion of the body A, of the cup-leather 10, secured to the lower end of the piece 6 and adapted to fit in the upper part of the plain portion of the body A in such manner that it will be expanded by the pressure of the liquid against said plain portion and prevent the liquid from coming in contact with the screw-threaded portions, substantially as specified.

2. In combination with the body A and piece 6, provided with a cup-leather packing at its lower end, the grooved shoulder 7 8 and packing 9, arranged, as shown, in the body A, and top piece, 6, the whole adapted to form a close joint, substantially as herein specified.

WILLIAM CALVERT JONES.

Witnesses:
DAVID S. SMITH,
ANDREW G. BLAIR,
*Both of Hellenic Steam Navigation Co., Syra.*